United States Patent

[11] 3,576,328

[72] Inventor Robert W. Vose
 1528 Piper Road, West Springfield, Mass. 01089
[21] Appl. No. 715,229
[22] Filed Mar. 22, 1968
[45] Patented Apr. 27, 1971

[54] HIGH PRESSURE SEALS
 6 Claims, 6 Drawing Figs.
[52] U.S. Cl. .................................................. 277/149
[51] Int. Cl. .................................................. F16j 15/32
[50] Field of Search .......................................... 277/47–
 —50, 149, 152, 153

[56] References Cited
 UNITED STATES PATENTS
| 3,099,454 | 7/1963 | Walinski | 277/47 |
| 1,989,110 | 1/1935 | Penniman | 277/152X |
| 2,093,572 | 9/1937 | Padgett | 277/117 |
| 2,560,557 | 7/1951 | Curtis | 277/152 |
| 2,867,462 | 1/1959 | Nielsen | 277/152 |
| 3,210,086 | 10/1965 | Hudson et al. | 277/153X |
| 3,250,541 | 5/1966 | McKinven, Jr. | 277/152X |
| 3,367,666 | 2/1968 | Symons | 277/152X |

FOREIGN PATENTS
| 613,460 | 11/1948 | Great Britain | 277/49 |

OTHER REFERENCES
" Flange Type Seals for Ball and Roller Bearing Applications" Product Engineering November 1948 Pages 122— 123

Primary Examiner—Laverne D. Geiger
Assistant Examiner—Edward J. Earls
Attorneys—Kenwood Ross and Chester E. Flavin ABSTRACT: Sealing devices cooperant with mechanical members having relatively sliding surfaces for withstanding combinations of high sliding speed and high fluid pressure and for absorbing relatively large normal displacements of the sliding surfaces caused by vibration or mechanical imperfections.

INVENTOR
ROBERT W. VOSE
Kenwood Ross and
BY Chester E. Flavin
ATTORNEYS

HIGH PRESSURE SEALS

BACKGROUND OF THE INVENTION

1. Field of the Invention

The invention relates to sealing devices for preventing fluid leakage between mechanical members having relatively sliding surfaces and for withstanding high fluid pressure and high sliding speed in combination incorporating the principle of a suspended flexible element.

2. Description of the Prior Art

Simple lip-type seals have been extensively used for preventing leakage around shafts, pistons, piston rods, and like members where the fluid pressure is low or the sliding speed is slow. For the reason that a considerable portion of the sealing element in such seals may be forced against the sliding surface by the applied pressure, these seals are subject to high friction, high heat generation, and premature wear, especially if both the fluid pressure and sliding speed are high.

Two other forms of seals have also been widely used, namely, the restricted elastomeric seals, descriptively classed as O-rings and the adjustably confined semielastomeric seals of a wide variety of designs, sometimes classed as packing-and-stuffingbox devices. With each form, as long as the sealing element retains a sufficient flexibility so as to adjust to any minor normal displacement of the sliding surface against which it seals, the sealing element correspondingly transmits a normal component of the applied fluid pressure to the sliding surface, again resulting in high friction and wear under severe conditions. In order to contend with such conditions, it has been customary to resort either to a stuffingbox manually adjusted for slight leakage to allow for lubrication and cooling, or to some relatively bulky and expensive seal of the lapped-face or piston-ring types.

Certain prior patents are known although the present invention is clearly distinguished in its functioning from the prior art, despite superficial similarities which may appear.

Numerous prior patents, including those of Hubbard Ser. No. 2,273,962, Reynolds Ser. No. 2,358,536 and Ser. No. 2,482,029, and Heimbuch Ser. No. 2,635,907, show a flexible web portion of arcuate or other form between a sealing face or lip and a fastening rim. However, in none of these is there any structural support for this portion against applied fluid pressure.

Reynolds, in Ser. No. 2,358,536, and Heimbuch each show a constraining ring to prevent distortion of the sealing lip. However, in neither is the ring adapted to provide support against pressure. In all constructions similar to the foregoing, the flexible portion is subject either to complete structural collapse under high pressure or to crowding against the rubbing surface of the shaft with consequent heating and failure.

In Bernstein Ser. No. 2,213,116, a portion of the sealing element carrying the sealing lip is slideably supported on an element of the shell, thus in theory allowing for normal shaft motion. However, any application of pressure would tend to jam this arrangement and to render it ineffective; the flexible web is arranged convexly toward the applied pressure, thus presenting an unstable configuration which is subject to collapse.

In Padgett Ser. No. 2,093,572, there is shown a member directly supporting the sealing lip, which member is rigid, however. While this member is capable of some initial sliding, as in the invention of Bernstein, it is incapable of allowing for flexible action of the seal as a whole during operation under pressure.

SUMMARY OF THE INVENTION

A sealing device herein comprehended prevents leakage of fluids between mechanical members having relatively sliding surfaces, is comparable to a lip seal in its compactness and simplicity and economy, will withstand high fluid pressure and high sliding speed in combination, will absorb relatively large normal displacements of the sliding members as may be caused by vibration or eccentricity or other mechanical imperfection, and may employ a relatively hard and wear-resisting elastomeric compound in its sealing element and yet possess sufficient flexibility in its structure as to accomplish the aforestated displacement absorbing characteristic.

DESCRIPTION OF THE PREFERRED EMBODIMENTS

Figure 1:
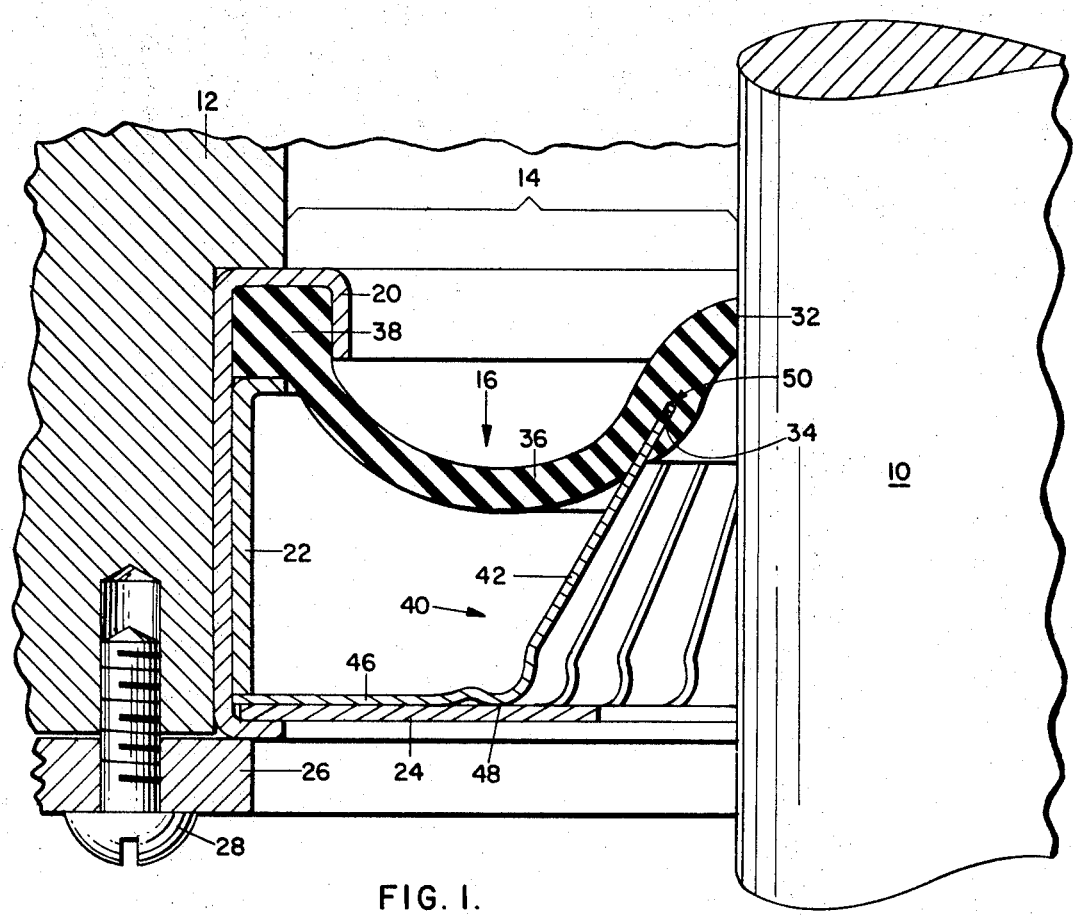
FIG. 1 is a view, in partial cross section, of a preferred form of the seal of the invention, showing its relation to its cooperating mechanical parts.

Two machine elements with relatively slideable surfaces are shown in FIG. 1 in the form of a shaft 10 and a housing 12.

Between the relatively movable shaft and housing, a gap 14, in the form of an annular space, is defined, which gap is filled with the fluid desired to be retained by the seal.

To bridge gap 14, an elastomeric sealing element 16 is provided.

As is common in elastomeric lip-sealing devices, sealing element 16 is held fast with respect to a structural containing shell of one of the preferred types, the same being generally annular and cup-shaped as shown and consisting of mating elements 20, 22 and 24, which elements are suitably shaped for the reception thereinto of the complemental sealing element, in the manner known in the art.

The structural containing shell, in turn, is mounted with respect to housing 12 as by means of a cap 26 which may be secured to the housing by a capscrew 28 or by equivalent means.

Sealing element 16 will be observed to be suspended upon a supporting strut 40 which is mounted within and with respect to the containing shell in any suitable manner so as to be caused to have a bearing engagement upon element 24 of the containing shell.

Sealing element 16 may be made of any suitable elastomeric material, many types of which are readily available, each having particular desirable properties of elasticity, chemical resistance and wear capacity.

Sealing element 16 includes four specific regions or areas according to function which are a sealing face 32 (where the seal makes sliding contact with the surface of shaft 10 at the point where the sealing action proper ensues), a suspension seat 34, a diaphragm 36 (a relatively thin and flexible expanse of arcuate cross section), and a fastening rim 38.

Under the pressure of fluid in gap 14, diaphragm 36 of the sealing element is suspended in tension from its fastening rim 38, which is supported by shell elements 20 and 22, and is suspended by the thrust of supporting strut 40 upon seat 34.

Supporting strut 40 comprises a plurality of radially-extending, centrally-converging, angularly-related fingers 42 which, preferentially, are made of thin metal having a high elastic limit, such as oil tempered steel or hard rolled phosphor bronze. The fingers are spaced as to each other to define notches 44 therebetween, and the fingers may, if desired, extend from and be integral with an annular, centrally-apertured ring 46. Extremities 50 of fingers 42 of strut 40 engage with seal 16 at seat 34.

Fingers 42, collectively, constitute the supporting strut proper, and are so shaped as to transfer downward thrust to shell element 24 at 48, while concomitantly being capable of slight deflection at extremity 50 as to follow any motion of sealing face 32 as the latter accommodates to any vibration, eccentricity, or other normal motion of the sliding surface of shaft 10.

Fluid pressure in gap 14 creates in seal 16 a "diaphragm tension" which may be described as acting along arc centerline 52. This tension is transferred at fastening rim 38 to shell elements 20 and 22, and at seat 34 to supporting strut 40.

Figure 3:
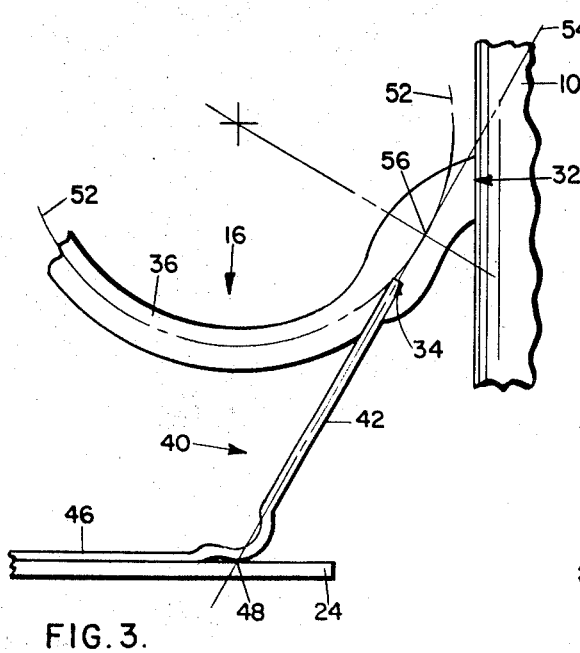
FIG. 3 is a diagrammatic view showing the basic geometry of the seal shown in FIGS. 1 and 2.

The geometry in the vicinity of seat 34 is critical in the action of the seal, and this is shown most clearly in FIG. 3. The cooperating elements are so designed and constructed that arc centerline 52 is tangent to centerline 54 of fingers 42 of supporting strut 40 at a tangent point 56, with a portion of seal 16 carrying face 32 extending beyond point 56. It follows from the principles of mechanics that the action of fluid pressure on the suspended diaphragm portion 36 of seal 16 up to tangent point 56 is exactly balanced, or neutralized, by the thrust of supporting strut 40. At the same time, diaphragm 36 is free to flex as face 32 follows any normal motion of shaft 10 and strut 40 deflects correspondingly.

The inherent balancing effect of the thrust of supporting strut 40 and the tension of diaphragm 36 does not extend beyond tangent point 56, and the fluid pressure acting on the remaining small area of seal 16 therefore forces face 32 against shaft 10. By making this remaining area slightly greater than the area of face 32, the contact pressure at face 32 may be made greater than the applied fluid pressure, thus assuring a definite sealing action.

In addition to the described basic sealing action, it is desirable to provide for an initial sealing pressure of face 32 against shaft 10 in cases where the applied fluid pressure may be low or negligible. Such may be arranged by constructing seal 16 with its diameter at face 32 slightly smaller than the diameter of shaft 10, and forcing seal 16 over a shaft 10 at assembly. Alternatively, supporting strut 40, having considerable inherent elasticity, may be biased to urge face 32 against shaft 10. Still another alternative is to provide a separate spring member, in leaf or garter form, specifically designed to urge face 32 against shaft 10; such spring members are common in the art and form no essential part of the present invention.

Seal 16 may be strengthened against high fluid pressure by reinforcing it with fabric or similar material molded into the elastomer at the time of manufacture, according to well known methods. Likewise, seal 16 may be positively attached to supporting strut 40 in the region of suspension seat 34 by bonding, cementing, or mechanical interlocking to prevent separation of these elements during assembly of the seal over the shaft, and to minimize any distortion of seal 16 in the region of face 32 under applied fluid pressure.

Figure 2:
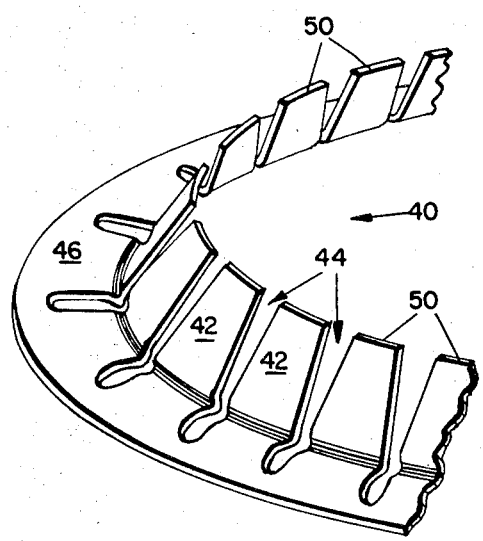
FIG. 2 is a partial view, in perspective, of one of the essential elements of the FIG. 1 seal.

Supporting strut 40, a basic element in the present invention, may be constructed in ways other than as shown in FIGS. 1—3.

Figure 4:
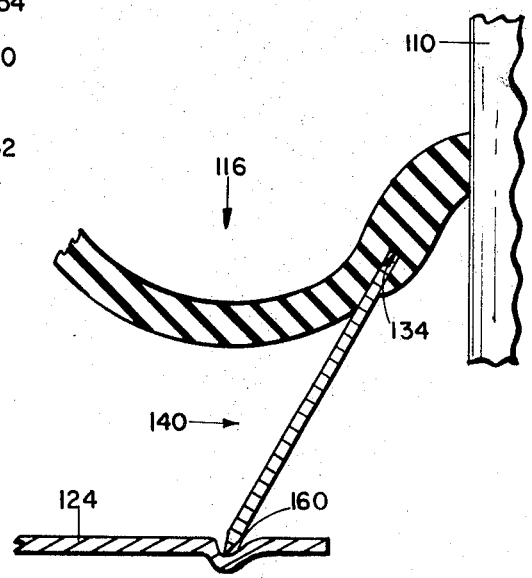
FIGS. 4—6 are diagrammatic views, similar to FIG. 3, showing various modifications in the form of the seal of the invention.

As an alternative form of construction, with reference to FIG. 4, a supporting strut 140 may be pivotally engaged in an annular notch 160 in shell member 124 with the opposite extremity of the strut being bonded at the suspension seat 134 of seal 116, which seal bears against shaft 110.

Figure 5:
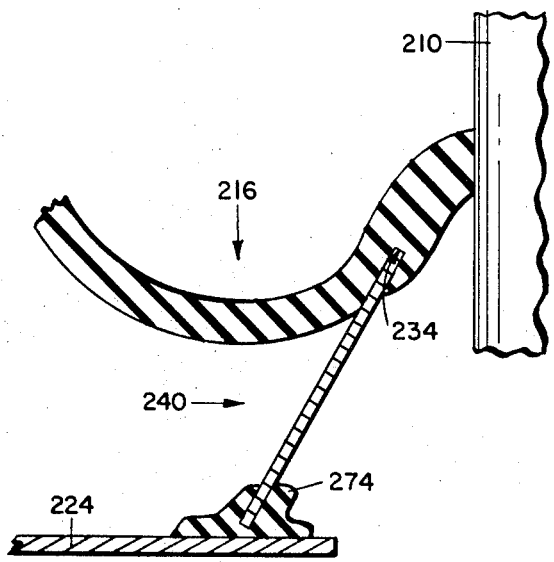

As another exemplification of a modified form of supporting strut construction, and with reference to FIG. 5, a supporting strut 240 may be pivotally bonded in an elastomeric seat 274 suitably secured to shell member 224, with the opposite extremity of the strut proper being bonded at the suspension seat 234 of a seal 216, which seal will bear against a shaft 210.

As still another exemplification, a supporting strut 340 may comprise fingers 342 encased in elastomer 366 molded integrally with seal 316, which seal will bear against a shaft 310 as the elastomeric encasement seats against shell member 324.

Figure 6:
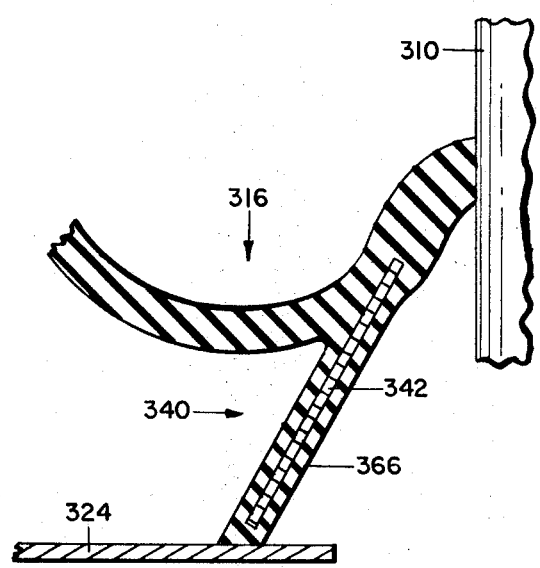

In the alternative constructions described above and shown in FIGS. 4, 5, and 6, it is to be understood that the supporting struts 140, 240, and 340 in the respective cases may consist of a plurality of individual members, narrow with respect to the plane of the drawing, and arranged similarly to the fingers of strut 40 shown in perspective in FIG. 2.

Each exemplification has been, understandably, in terms of a mechanical pair consisting of a shaft and a housing. It is to be understood that this invention, without change in principle and with modifications within the capabilities of a designer, may be applied with equal facility to the sealing of any two members having relatively sliding surfaces, such as a piston and a cylinder, a shaft flange and a housing, and a valve gate and its seat.

Likewise, it is to be understood that the sliding surfaces may be flat or cylindrical or spherical.

Additionally, it is comprehended that the relative sliding motion may arise from the rotating, reciprocating, or oscillating action of the mechanical members.

With this disclosure now in mind, it will be readily observed that the teaching allows certain desirable results which are not obtainable in a seal of the conventional lip-type, or in any heretofore known compact and inexpensive type of seal.

Special attention is called to the fact that the suspended diaphragm portion of the sealing element is functionally isolated from the sealing face, thereby permitting the yielding and sealing functions to be separately designed.

Significant also is the fact that the suspended diaphragm portion of the sealing element is structurally suited to withstand heavy fluid pressure, and may be made thin and flexible without any sacrifice of this strength.

To be stressed here is the fact that advantage may be taken of this structural flexibility to use a relatively hard or stiff elastomeric compound in the sealing element, thereby obtaining favorable friction and wear-resisting qualities at the sealing face.

With such use of a hard or stiff material, the sealing face will retain its form and may be designed to present a narrow rubbing area against the sliding surface, thereby limiting the total friction, heat generation, and resulting wear.

The loading of the sealing face may be controlled through the geometry of the strut-suspended diaphragm to bring about the desired sealing action, but without any excess load to aggravate unduly friction and wear at the rubbing surfaces.

I claim:

1. A seal for preventing passage of fluid between a pair of mechanical members having relatively sliding surfaces including: a flexible sealing element having a diaphragm portion of arcuate cross section concavely disposed toward the fluid being retained and a face portion and a suspension seat, and a deflectable strut element, the diaphragm portion being suspended from the strut element at the suspension seat, the diaphragm and face portions of the sealing element being disposed oppositely with respect to the suspension seat.

2. A seal as set forth in claim 1, in which the diaphragm portion is suspended tangentially with respect to the strut element.

3. A sealing device for preventing the passage of fluid between a pair of mechanical members having relatively sliding surfaces comprising: a shell assembly adaptable to mounting in one of the mechanical members, a flexible sealing element having a diaphragm portion of arcuate cross section concavely disposed toward the fluid being retained and a fastening rim at one boundary of the diaphragm portion engageable by the shell assembly and a face portion beyond the opposite boundary of the diaphragm portion bearing slideably on the surface of the other of the mechanical members, and a deflectable strut element supported by the shell assembly and suspending the diaphragm portion of the sealing element near the junction of the diaphragm and face portions of the sealing element against the applied pressure of the fluid to be retained.

4. A sealing device as set forth in claim 3, in which the strut element suspends the diaphragm portion of the sealing element in a tangential relationship.

5. A sealing means cooperant with a pair of mechanical members having relatively sliding surfaces and with a fluid in the gap between the members for preventing the passage of the fluid under conditions of high fluid pressure, high sliding speed, and relatively large normal displacements of the sliding surfaces caused by vibration or mechanical imperfections, and including in combination, a sealing element including a flexible diaphragm portion of arcuate cross section concavely disposed toward the fluid being retained and a sealing face portion and a suspension point portion, and, a deflectable strut element suspending the diaphragm portion of the sealing element, the sealing face portion of the sealing element extending beyond the suspension point portion and being urged against one of the sliding surfaces by the applied fluid pressure.

6. A sealing means as set forth in claim 5, in which the strut element acts tangentially with respect to the diaphragm portion of the sealing element.